July 6, 1926.

G. CONSTANTINESCO

POWER TRANSMISSION MECHANISM

Original Filed July 25, 1923

1,591,471

Inventor:
G. Constantinesco
by
atty

Patented July 6, 1926.

1,591,471

UNITED STATES PATENT OFFICE.

GEORGE CONSTANTINESCO, OF WEYBRIDGE, ENGLAND.

POWER-TRANSMISSION MECHANISM.

Original application filed July 25, 1923, Serial No. 653,775, and in Great Britain September 16, 1922. Divided and this application filed May 21, 1925. Serial No. 31,966.

In my prior United States Patent No. 1,542,668, a power transmission device is described in which reciprocating motion derived from a prime mover is divided between an oscillating mass and reciprocating devices which give unidirectional motion to a rotor, the oscillations or reciprocations of all the parts being of the same frequency. The amplitudes, however, of those of the oscillating mass and the unidirectional driving device bear to one another a ratio which is greater or less according as the opposing torque on the rotor is greater or less. In my former specification aforesaid the inertial mass was solid; according to my present invention it is liquid.

Figure 1:
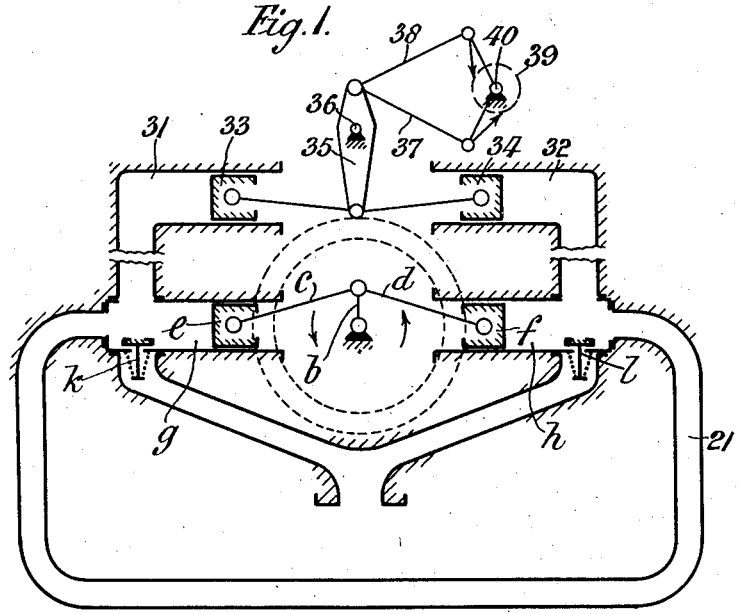
Figure 2:
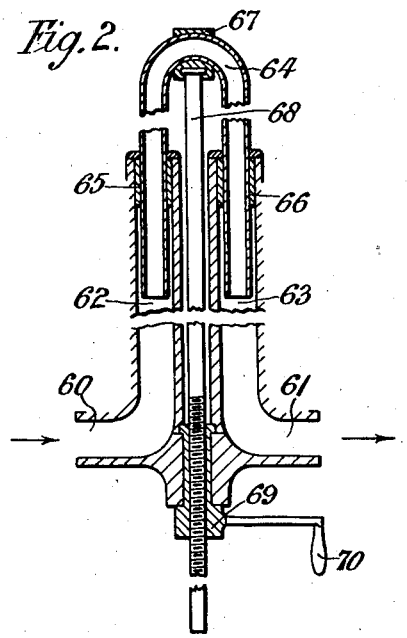

Figure 1 illustrates my invention, and Figure 2 is an additional detail,

In the form of the invention shown in Figure 1 the driving crank $b$ of the prime mover, the flywheel of which is shown in dotted lines, is connected by rods $c$ $d$ with pistons $e$ $f$ working in cylinders $g$ $h$. The cylinders $g$ $h$ are interconnected by a pipe 21 containing the liquid which forms the inertial mass. They are also provided with suction valves $k$ and $l$ leading to a source of supply, but liquid enters through these valves only sufficient to make up for leakage since no liquid is actually pumped. The cylinders $g$ $h$ are also connected with cylinders 31, 32, provided with pistons 33, 34, which actuate a lever 35 pivoted at 36 by means of rods. The lever is connected to a pair of rods 37 and 38, which actuate unidirectional driving devices operating on a rotor 39 pivoted at 40.

This application is particularly suitable for cases in which the prime mover is a machine giving a constant torque, but capable of variation of speed between certain limits. Variation of speed between these limits will produce considerable variation of pressure at the delivery of the cylinders. The apparatus is thus extremely suitable for traction purposes of vehicles; for example, in a traction engine an internal combustion engine may be provided driving the pistons $e$, $f$, the two cylinders $g$, $h$ being connected to the double opposed pistons or double acting piston driving a ratchet motor as above described.

The action is in all cases the same as that described in my prior specification above referred to. If, for instance, the torque on the rotor is so great that it cannot move, the pistons 33 and 34 remain stationary, and the whole motion of the prime mover is taken up in causing liquid to surge backwards and forwards in the pipe 21. If the torque is zero liquid in this pipe has little or no motion on account of its inertia, and all the motion of the prime mover is communicated to the unidirectional driving devices. Intermediate torques produce intermediate effects; the greater the torque on the rotor, the greater the surging in the pipe 21 and the less the movement of the driving devices; and conversely.

A variable inertia may be provided as shown in Figure 2. The apparatus consists of a casting comprising two branches 62, 63, which are placed in communication by means of a slidable U-shaped pipe 64 which is connected to the ends of the branches 62, 63, suitable glands 65, 66, being provided to make liquid tight joints at the junctions. The pipe 64 is embraced by a socket 67 connected to a rod 68 which can be raised or lowered by turning the nut 69 by means of the handle 70. The branches 62 and 63 can be connected up to any point of the pipe 21 by passages 60 and 61. With this device the inertia of the liquid column can be increased or decreased by merely turning the handle 70 to raise or lower the U-shaped pipe 64.

A variable inertia device of the pipe type may be obtained by using telescopic tubes which will permit the length of liquid column to be lengthened or shortened. By using variable inertia devices as above described, the maximum pressures in the system may be varied without varying the speed of the prime mover.

This application is a division of my application, Serial No. 653,775.

What I claim is:—

1. An automatic variable speed gear for transmitting power to a driven shaft which has to be rotated against a variable resisting torque comprising in combination a steadily rotating driving shaft, means for deriving alternating motion from said shaft, means for splitting such motion into two components, a liquid mass, means for transmitting one of said component motions to said mass, unidirectional driving mechanism operating upon the said driven shaft, and means for transmitting the other of the component motions to the said unidirectional driving mechanism.

2. An automatic variable speed gear for transmitting power to a driven shaft which has to be rotated against a variable resisting torque, comprising in combination a steadily rotating driving shaft, means for deriving alternating motion from said shaft, means for splitting such motion into two components, a liquid mass, means for transmitting one of said component motions to said mass, unidirectional driving mechanism giving at least two impulses in the same direction on said driven shaft for each revolution of said steadily rotating shaft, and means for transmitting the other of the component motions to the said unidirectional driving mechanism.

3. An automatic variable speed gear for transmitting power to a driven shaft, which has to be rotated against a variable resisting torque, comprising in combination a driving crank, a liquid mass capable of oscillation, a pair of unidirectional driving devices adapted to drive a driven shaft alternately in the same direction, and means for splitting the motion of the said driving crank between the said oscillating liquid mass and said unidirectional driving devices.

4. An automatic variable speed gear for transmitting power from a steadily rotating driving shaft to a shaft which has to be rotated against a variable resisting torque, comprising in combination a crank on said driving shaft, a pair of liquid containing cylinders oppositely disposed with respect to the said driving shaft, a pair of pistons actuated in opposite phase by the said crank, and working in the said cylinders, a pipe connecting the ends of said cylinders, said pipe containing fluid capable of oscillation therein, a second pair of cylinders freely communicating with the first named pair of cylinders each to each, pistons in the said second pair of cylinders subject to fluid pressure generated in the first pair, a rotor, and a pair of unidirectional driving devices operatively connected with the second pair of pistons and actuating the rotor.

In testimony that I claim the foregoing as my invention I have signed by name this eighth day of May, 1925.

GEORGE CONSTANTINESCO.